(12) United States Patent
Adachi

(10) Patent No.: US 12,112,419 B2
(45) Date of Patent: *Oct. 8, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Daichi Adachi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,107

(22) Filed: Mar. 22, 2022

(65) Prior Publication Data

US 2022/0215610 A1     Jul. 7, 2022

Related U.S. Application Data

(63) Continuation of application No. 16/887,249, filed on May 29, 2020, now Pat. No. 11,308,679.

(30) Foreign Application Priority Data

Jun. 3, 2019   (JP) ................................. 2019-103846

(51) Int. Cl.
   *G06T 15/00*       (2011.01)
   *G06T 7/70*         (2017.01)
   *G06T 17/00*       (2006.01)

(52) U.S. Cl.
   CPC ................ *G06T 15/00* (2013.01); *G06T 7/70* (2017.01); *G06T 17/00* (2013.01)

(58) Field of Classification Search
   None
   See application file for complete search history.

(56) References Cited

U.S. PATENT DOCUMENTS 8,576,276 B2 *  11/2013  Bar-Zeev .............. G06T 19/006
                                                              348/53
2010/0259539 A1  10/2010  Papanikolopoulos
(Continued)

FOREIGN PATENT DOCUMENTS

JP     2017212592 A     11/2017
JP     2018133063 A      8/2018
JP     2019067130 A      4/2019

OTHER PUBLICATIONS

Office Action issued in U.S. Appl. No. 16/887,249 mailed Jun. 14, 2021.

(Continued)

*Primary Examiner* — Kee M Tung
*Assistant Examiner* — Jed-Justin Imperial
(74) *Attorney, Agent, or Firm* — ROSSI, KIMMS & McDOWELL LLP

(57) ABSTRACT

The technique of this disclosure suppresses a reduction in visibility of a predetermined object in virtual viewpoint image data. An image processing apparatus includes: an image capturing information acquisition unit configured to acquire image capturing information indicating a position and orientation of each of a plurality of image capturing apparatuses; an object information acquisition unit configured to acquire object information indicating a position and orientation of an object to be captured by the image capturing apparatuses, the object having a specific viewing angle; and a determination unit configured to determine, based on the acquired image capturing information and the position and orientation of the object indicated by the acquired object information, an image to be used for generating a virtual viewpoint image according to a position and orientation of a virtual viewpoint among a plurality of images based on capturing by the image capturing apparatuses.

17 Claims, 12 Drawing Sheets

(56) References Cited

U.S. PATENT DOCUMENTS

| | | |
|---|---|---|
| 2015/0304557 A1 | 10/2015 | Choi |
| 2018/0098047 A1 | 4/2018 | Itakura |
| 2019/0104235 A1* | 4/2019 | Sarkar .................... H04N 5/272 |
| 2019/0105568 A1 | 4/2019 | Platt |
| 2019/0118091 A1* | 4/2019 | Taylor .................... A63F 13/25 |
| 2019/0258318 A1* | 8/2019 | Qin .......................... G06F 3/01 |

OTHER PUBLICATIONS

Notice of Allowance issued in U.S. Appl. No. 16/887,249 mailed Dec. 24, 2021.
Office Action issued on Japanese Appln. No. 2019-103846 mailed on Jun. 6, 2023. English translation provided.

* cited by examiner

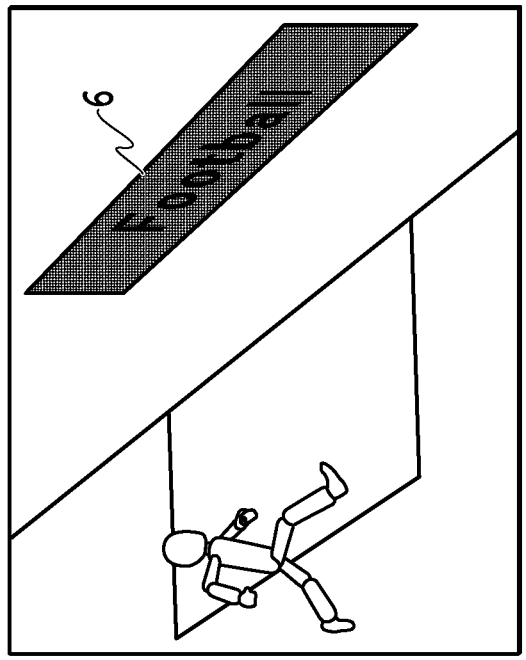
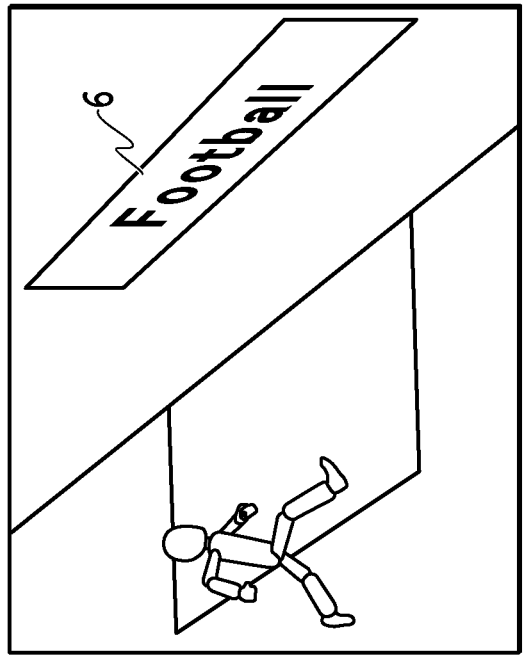
FIG.6A WITHOUT PRIORITY
FIG.6B WITH PRIORITY

IMAGE PROCESSING APPARATUS, IMAGE PROCESSING METHOD, AND STORAGE MEDIUM

BACKGROUND OF THE INVENTION

Field of the Invention

The present disclosure relates to a technique to generate virtual viewpoint image data using a plurality of pieces of captured image data.

Description of the Related Art

In recent years, attention is being given to a technique to generate virtual viewpoint image data showing an appearance from a virtual viewpoint using a plurality of pieces of captured image data (multiple viewpoint image data) obtained by locating a plurality of cameras in different positions and synchronously capturing images from multiple viewpoints using these cameras. For example, a soccer or basketball highlight can be watched from various angles by using this technique, which can provide a user with a high degree of realism as compared with a normal image.

Japanese Patent Laid-Open No. 2017-212592 discloses a method of generating virtual viewpoint image data by deriving a three-dimensional model (three-dimensional shape data) of an object from captured image data obtained from a plurality of cameras and rendering the three-dimensional model using the captured image data.

However, there is a problem in generation of virtual viewpoint image data according to the conventional method. For example, digital signage around a field to be captured often uses a display apparatus using a light source with high directivity for a display screen such as an LED display. Further, a capturing area often includes an object having a surface that does not emit light by itself but reflects light with high directivity. In the case of such an object having a surface with a narrow viewing angle, generation of virtual viewpoint image data mainly using captured image data obtained by cameras located outside the viewing angle of the object has a problem that a display screen or a surface of the object in the virtual viewpoint image data is rendered darkly and has reduced visibility.

Therefore, the technique of this disclosure aims to suppress a reduction in visibility of a predetermined object in virtual viewpoint image data.

SUMMARY OF THE INVENTION

The technique of this disclosure is an image processing apparatus comprising: an image capturing information acquisition unit configured to acquire image capturing information indicating a position and orientation of each of a plurality of image capturing apparatuses; an object information acquisition unit configured to acquire object information indicating a position and orientation of an object to be captured by the image capturing apparatuses, the object having a specific viewing angle; and a determination unit configured to determine, based on the acquired image capturing information and the position and orientation of the object indicated by the acquired object information, an image to be used for generating a virtual viewpoint image according to a position and orientation of a virtual viewpoint among a plurality of images based on capturing by the image capturing apparatuses.

Further features of the technique of this disclosure will become apparent from the following description of exemplary embodiments with reference to the attached drawings.

BRIEF DESCRIPTION OF THE DRAWINGS

FIG. 6A is a diagram for comparing virtual viewpoint images according to the presence/absence of application of the technique of this disclosure in the first embodiment;

FIG. 6B is a diagram for comparing virtual viewpoint images according to the presence/absence of application of the technique of this disclosure in the first embodiment;

DESCRIPTION OF THE EMBODIMENTS

First Embodiment

In the present embodiment, a description will be given of a system in which a plurality of cameras are arranged in a soccer stadium and a plurality of pieces of captured image data obtained by capturing using the respective cameras are used to generate virtual viewpoint image data. A description will also be given of a method of generating virtual viewpoint image data based on a normal direction of an LED display and camera arrangement information (information about positions and directions of cameras) in a field.

Figure 1:
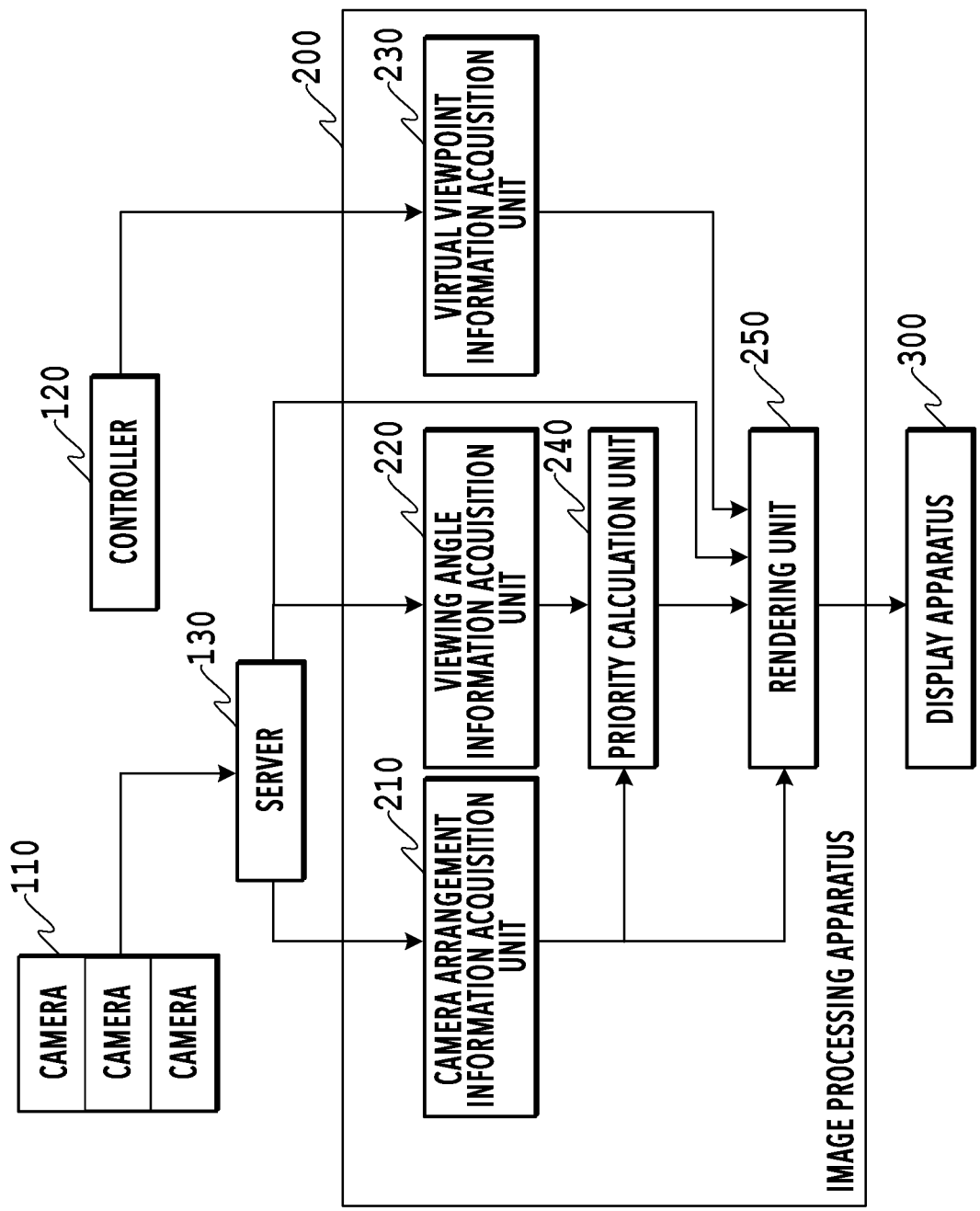
FIG. 1 is a system configuration diagram in a first embodiment.

FIG. 1 shows a system configuration for generating virtual viewpoint image. A plurality of cameras 110 are arranged so as to capture an object in a field from multiple viewpoints and transmit camera arrangement information and captured image data to a server 130 via a network. Although the same reference numeral is assigned to the cameras 110, the cameras may be image capturing apparatuses different in performance and model.

The server 130 calibrates the cameras 110 using the camera arrangement information and captured image data received obtained by the cameras 110 and stores camera arrangement information after the calibration in an unshown storage unit.

The server 130 also extracts a foreground object (such as a player or ball) using the captured image data and camera arrangement information received obtained by the cameras 110. The server 130 then generates a three-dimensional model (three-dimensional shape data) of the foreground object extracted according to the principle of stereoscopic analysis and stores the model in the unshown storage unit.

The server 130 also stores in advance a three-dimensional model of a background object (such as a soccer stadium, field, LED display, or soccer goal) obtained through measurements by a laser scanner in the unshown storage unit. At this time, a three-dimensional model of an object having a specific viewing angle (for example, a predetermined object that emits light with high directivity and has a narrow viewing angle) such as an LED display is stored in association with information indicating the position and orientation of the object (viewing angle information to be described later). The viewing angle used herein means an angle between a view direction and a normal direction in a position in front of an object surface in which a reference appearance is maintained, the reference appearance being an appearance of the object surface viewed from the front of the object surface. That is, a central direction of the viewing angle according to the orientation of the object surface is parallel to the normal direction with respect to the object surface.

A controller 120 is a UI for generating virtual viewpoint information designating the position, orientation, and focal length of a virtual viewpoint based on user operation. The controller 120 is connected to an image processing apparatus 200 via the network to transmit the generated virtual viewpoint information to a rendering unit 250 in the image processing apparatus 200.

The image processing apparatus 200 implements each of the functional components, a camera arrangement information acquisition unit 210, a viewing angle information acquisition unit 220, a virtual viewpoint information acquisition unit 230, a priority calculation unit 240, and a rendering unit 250, by a CPU 201 executing a program, which will be described later. The image processing apparatus 200 is connected to the controller 120, the server 130, and the display apparatus 300 via the network.

The camera arrangement information acquisition unit 210 acquires camera arrangement information from the server 130 via a communication unit 205 and a network.

The viewing angle information acquisition unit 220 acquires viewing angle information from the server 130 via the communication unit 205 and the network.

The virtual viewpoint information acquisition unit 230 acquires virtual viewpoint information from the controller 120 via the communication unit 205 and the network.

The priority calculation unit 240 calculates a priority based on the camera arrangement information acquired by the camera arrangement information acquisition unit 210 and the viewing angle information acquired by the viewing angle information acquisition unit 220.

The rendering unit 250 acquires the captured image data and the three-dimensional models of the foreground and background objects from the server 130. The rendering unit 250 acquires the camera arrangement information obtained by the camera arrangement information acquisition unit 210, the virtual viewpoint information from the virtual viewpoint information acquisition unit 230, and the priority from the priority calculation unit 240. The rendering unit 250 renders the three-dimensional models of the foreground and background objects using the captured image data to generate virtual viewpoint image data indicating the appearance from the virtual viewpoint designated by the virtual viewpoint information.

The display apparatus 300 is connected to the image processing apparatus 200 via the network or a video transmission path such as an SDI and displays the virtual viewpoint image data rendered by the rendering unit 250. The image processing apparatus 200 may output the virtual viewpoint image data not only to the display apparatus 300 but to, for example, a storage apparatus configured to store virtual viewpoint image data.

Figure 2:
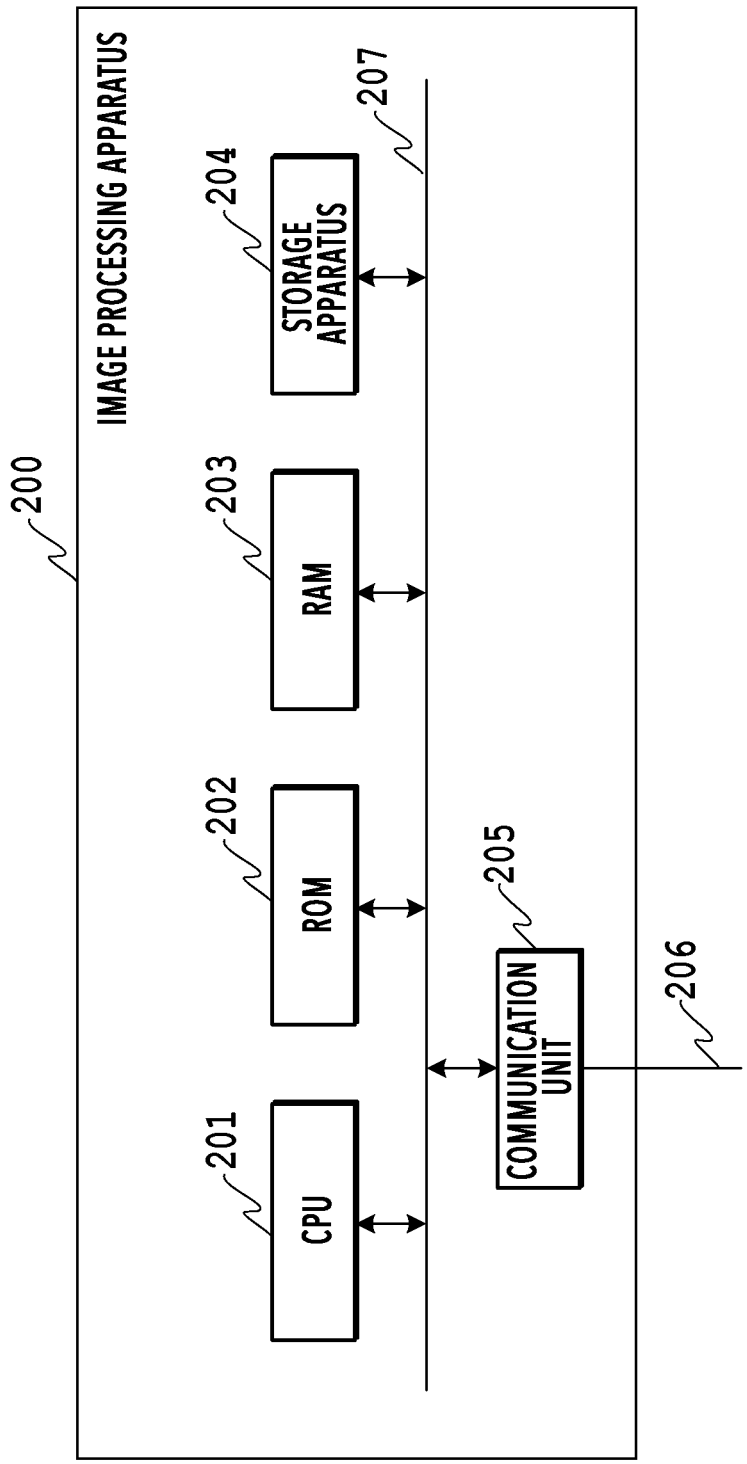
FIG. 2 is a hardware configuration diagram in the first embodiment.

FIG. 2 is a hardware configuration diagram of the image processing apparatus 200 in the present embodiment. The image processing apparatus 200 comprises the CPU 201, a ROM 202, a RAM 203, a storage apparatus 204, and a communication unit 205.

The CPU 201 is a central arithmetic unit configured to control the entire image processing apparatus 200 and has control over a processing sequence of the image processing apparatus 200. The ROM 202 and the storage apparatus 204 store a program and data for implementing a processing flow to be described later. The RAM 203 is used to store data temporarily and load a program. The communication unit 205 transmits/receives data to/from an external apparatus via a network 206. For example, the communication unit 205 transmits virtual viewpoint image data subjected to image composition by the image processing apparatus 200 to the display apparatus 300 via the network 206. The components of the image processing apparatus 200 are connected to each other via a bus 207.

Figure 3:
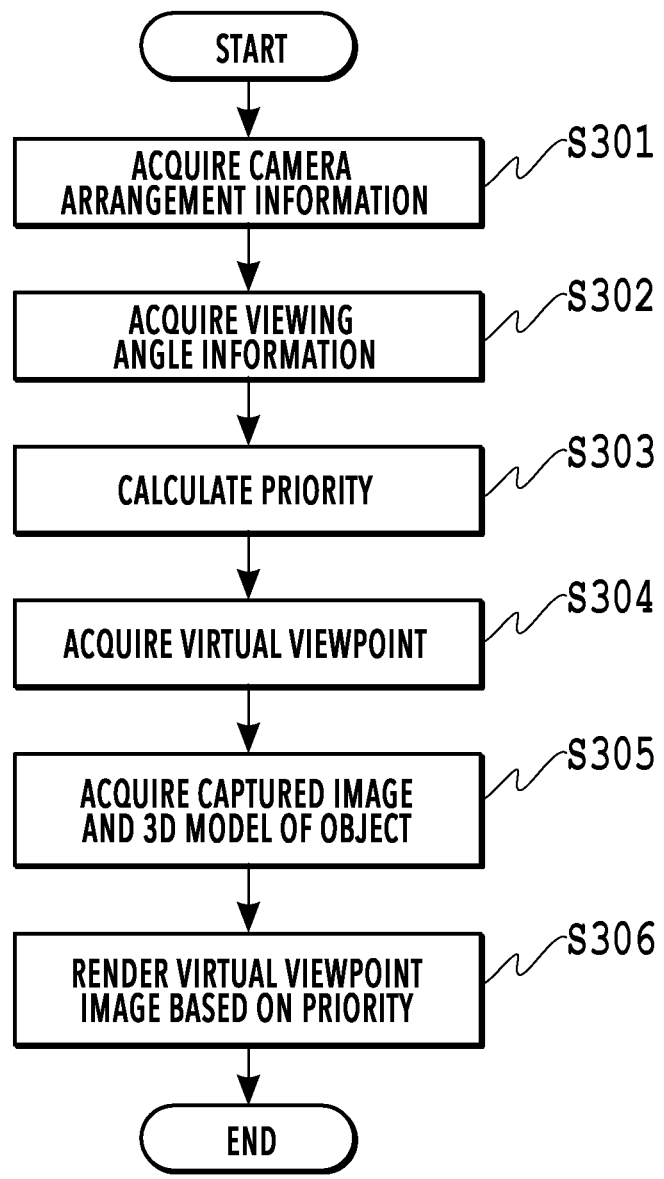
FIG. 3 is a diagram showing a processing flow of an image generation apparatus in the first embodiment.

Next, a processing flow by each component of the image processing apparatus 200 will be described with reference to the flowchart shown in FIG. 3. A program used for the processing shown in this flowchart is stored in the storage apparatus of the image processing apparatus 200, invoked by the ROM 202, and executed by the CPU 201.

In step S301, the camera arrangement information acquisition unit 210 acquires calibrated camera arrangement information. The camera arrangement information is data describing a position $T=(t_x, t_y, t_z)$ and an optical axis direction $R_{opt}=(r_x, r_y, r_z)$ of each camera. The calibrated camera arrangement information is calculated in advance through calibration using the camera arrangement information and captured image data received obtained by the cameras 110 in the server 130, as disclosed in Japanese Patent Laid-Open No. 2017-212592. In the following description, "camera arrangement information" indicates the calibrated camera arrangement information.

In step S302, the viewing angle information acquisition unit 220 acquires viewing angle information. The viewing angle information is data describing a position $T_{led}=(x, y, z)$ of an LED display 6 on a display screen and a normal direction $N=(n_x, n_y, n_z)$ of the display screen of the LED display 6 in the position $T_{led}$.

In step S303, the priority calculation unit 240 calculates a priority of captured image data used for rendering based on the camera arrangement information and the viewing angle information.

Figure 4:
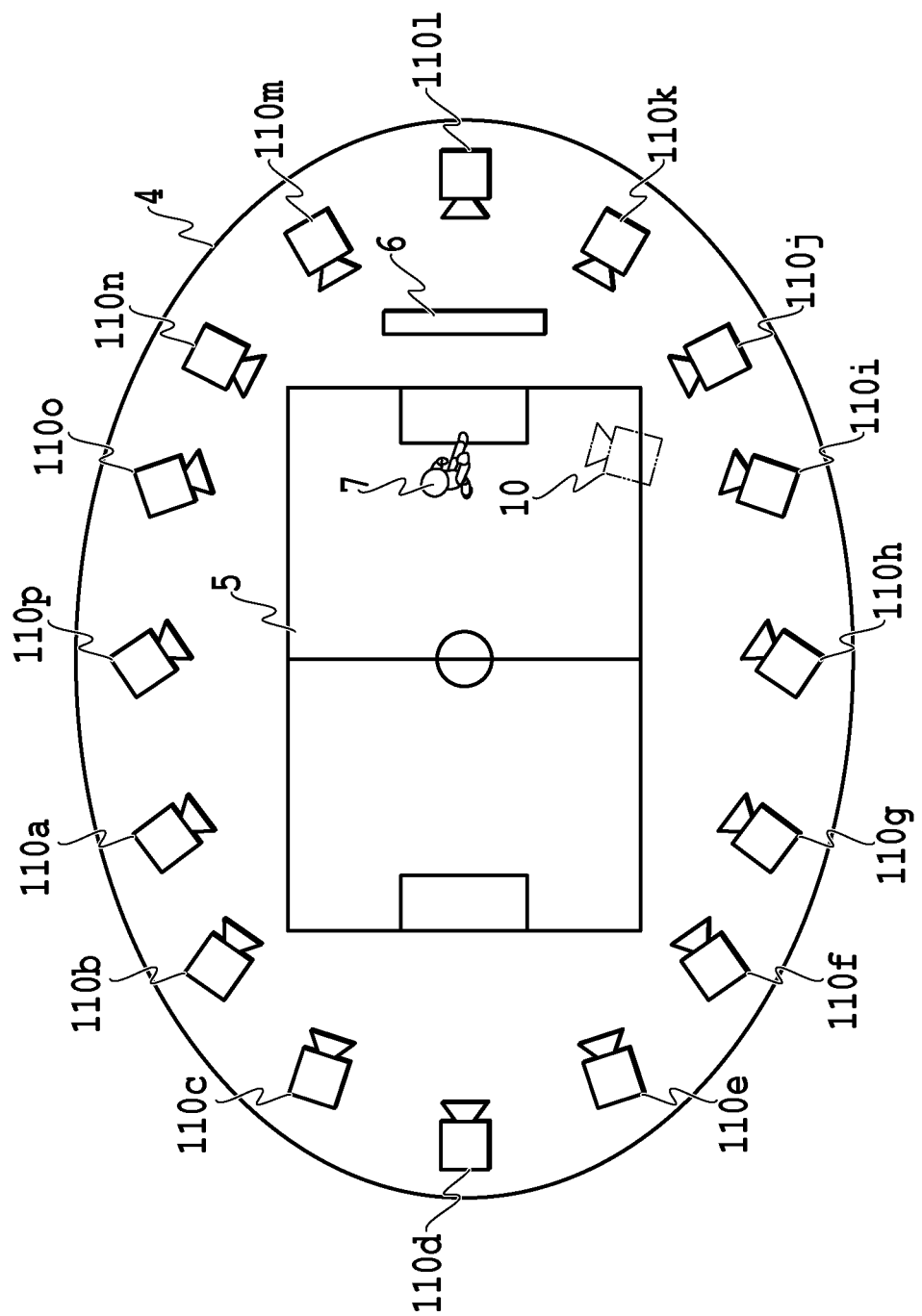
FIG. 4 is a diagram showing camera arrangement in the first embodiment.

FIG. 4 shows the camera arrangement of the cameras 110. Cameras 110a to 110p are all arranged to surround a soccer stadium 4 and capture a capturing area including a field 5 and the LED display 6 on the periphery of the field 5. There is a player 7 in the field 5. As a result, a virtual viewpoint image from a virtual viewpoint (virtual camera) 10 shows the field 5, the LED display 6, and the player 7.

Among the objects shown in the virtual viewpoint image, the display screen of the LED display 6 using a light source with high directivity has significantly reduced visibility from the outside of the viewing angle. Therefore, in the present embodiment, captured image data clearly showing a display on the display screen of the LED display 6 is used for rendering the LED display 6.

In the present embodiment, a camera 110 that can obtain captured image data clearly showing the display on the display screen of the LED display 6 is determined based on a priority P calculated by the following formula (1):

$$P = -(R_{opt} \cdot N) = -(r_x \times n_x + r_y \times n_y + r_z \times n_z) \quad (1)$$

It is assumed that the optical axis direction $R_{opt}$ of the camera 110 and the normal direction N of the display screen of the LED display 6 are normalized such that the size of a vector is 1. The priority P becomes maximum in a camera 110 closest to the front of the LED display 6. In the example of FIG. 4, a camera 110d has the highest priority P.

In step S304, the virtual viewpoint information acquisition unit 230 acquires virtual viewpoint information from the controller 120. The virtual viewpoint information includes information about the position, orientation, and focal length of a virtual viewpoint obtained by user operation in the controller 120.

In step S305, the rendering unit 250 acquires, from the server 130, the captured image data obtained by the camera 110 and the three-dimensional models of the foreground and background objects.

In step S306, the rendering unit 250 renders virtual viewpoint image data indicating an appearance from a set virtual viewpoint 10 based on the captured image data, three-dimensional models of the foreground and background objects, priority, and virtual viewpoint information.

In the case of rendering an object other than the LED display 6 not associated with the viewing angle information, captured image data is used sequentially from captured image data obtained by a camera 110i close to the virtual viewpoint 10. On the other hand, in the case of rendering the LED display 6 associated with the viewing angle information, captured image data obtained by a camera 110 having a high priority P is preferentially used. Image-based rendering or model-based rendering disclosed in Japanese Patent Laid-Open No. 2017-212592 can be used for rendering in the rendering unit 250.

For rendering the LED display 6, for example, captured image data obtained by a camera 110 having the highest priority may be used. Alternatively, for example, captured image data obtained by a camera 110 selected from among cameras 110 having priorities equal to or higher than a threshold based on the position and orientation of each camera 110 may be used. The way to use the priorities for determining a captured image for use in rendering is not limited to these examples.

In addition, captured image data obtained by a camera 110 that has not captured a part or all of the LED display 6 is not necessarily used for rendering the LED display 6. For example, in a case where a player is located in a line connecting the position of a camera 110 and the position of the LED display 6, at least a part of the LED display 6 is occluded by the player in captured image data from this camera 110. If this captured image data is used for rendering, a color of the player is mistakenly applied to a model of the LED display 6. Therefore, the rendering unit 250 may render the LED display 6 using captured image data obtained by a camera 110 having a high priority among cameras 110 that have captured the entire LED display 6. Alternatively, the rendering unit 250 may render each part of the LED display 6 using captured image data obtained by a camera 110 having a high priority among cameras 110 that have captured the part. That is, in a case where a part of the LED display 6 is occluded viewed obtained by a camera 110, captured image data from this camera 110 may be used for rendering an un-occluded part. In this case, the captured image data obtained by the camera 110 may not be used for rendering the occluded part.

Figure 5A:
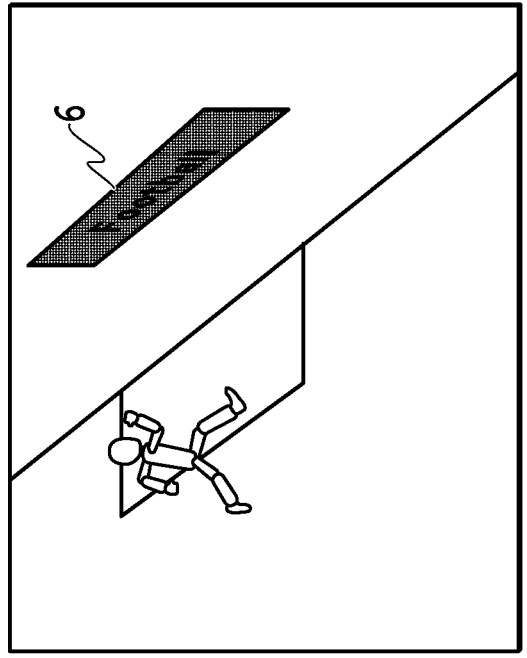
FIG. 5A shows an example of a captured image by a camera in the first embodiment.
Figure 5B:
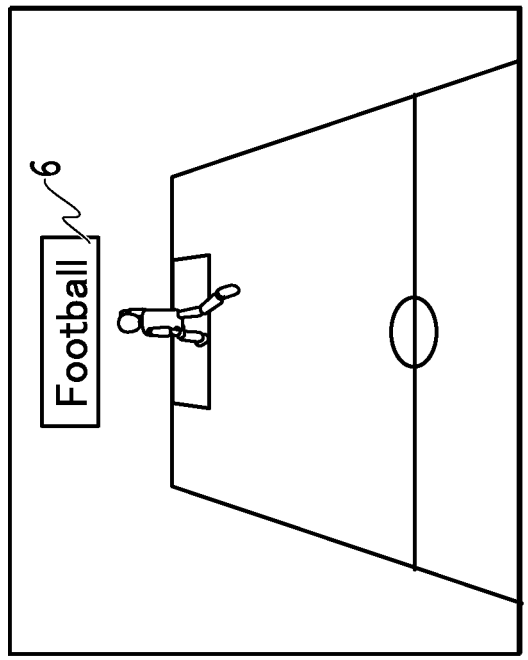
FIG. 5B shows another example of a captured image by a camera in the first embodiment.

FIG. 5A and FIG. 5B show schematic diagrams of captured image data obtained by cameras 110d and 110i. FIG. 5A shows captured image data obtained by the camera 110d. Since the LED display 6 is captured from the front, the character string "Football" displayed on the LED display 6 is captured clearly. In contrast, FIG. 5B shows captured image data obtained by the camera 110i. Since the LED display 6 is captured from the outside of the viewing angle of the display screen, the characters displayed on the display screen are captured darkly and less visibly.

FIG. 6A and FIG. 6B show a difference between rendering results using and not using the technique of this disclosure. FIG. 6A shows the result of rendering the LED display 6 in the same manner as other objects without consideration of the priority P. FIG. 6B shows the result of rendering in consideration of the priority P.

In FIG. 6A, since captured image data obtained by the camera 110i that has captured the LED display 6 from the side is used, the LED display 6 is rendered darkly and less visibly. In contrast, in FIG. 6B, since image data obtained by the camera 110d that has captured the LED display 6 from the front is used, the LED display 6 is rendered clearly.

The results of rendering as described above can be stored as virtual viewpoint image data in the storage apparatus 204 or transmitted as virtual viewpoint image data to the display apparatus 300 via the communication unit 205 and the network 206 and displayed.

As described above, priorities are calculated from the relationships between the normal line of the display screen of the object and the optical axes of the cameras and captured image data obtained by a camera having a high priority P is preferentially used for rendering, thereby reducing virtual viewpoints at which the visibility of the object decreases.

Although the entire LED display 6 is treated as a single object in the present embodiment, each constituent element of the LED display 6 may be treated as a single object. For example, each of voxels representing the LED display 6 may be treated as a single object. Viewing angle information may be set for each element such that a priority is calculated based on the viewing angle information set for each element. In this case, a plurality of pieces of viewing angle information can be set for the LED display 6 and the LED display 6 can be rendered using captured image data with a high priority for each element for which the viewing angle information is set.

An object for which viewing angle information is set is not limited to the display screen of the LED display and may be any object having visibility or appearance varying according to an angle of view such as a display screen of a liquid crystal display, a light-emitting surface of a light-emitting light fixture, an object with a glossy surface, and turf on the field. In these cases, the same advantageous result as the present embodiment can be produced.

Further, an object for which viewing angle information is set may be designated by a user or designated by the server 130 or another image processing apparatus based on an amount of change in image quality obtained by a comparison of captured image data obtained by each camera. Viewing angle information may also be set by a user or set by the server 130 or another image processing apparatus based on the amount of change in image quality.

Second Embodiment

In the first embodiment, the priorities are calculated based on the camera arrangement information and the viewing angle information. In the present embodiment, a description will be given of a method of calculating the priorities further in consideration of a virtual viewpoint and camera arrangement.

The configuration and processing flow of the present embodiment are the same as those of the first embodiment except for step S302 and step S306, which will be described below. Therefore, the description of the same configuration and processing flow as the first embodiment will be omitted.

Figure 7:
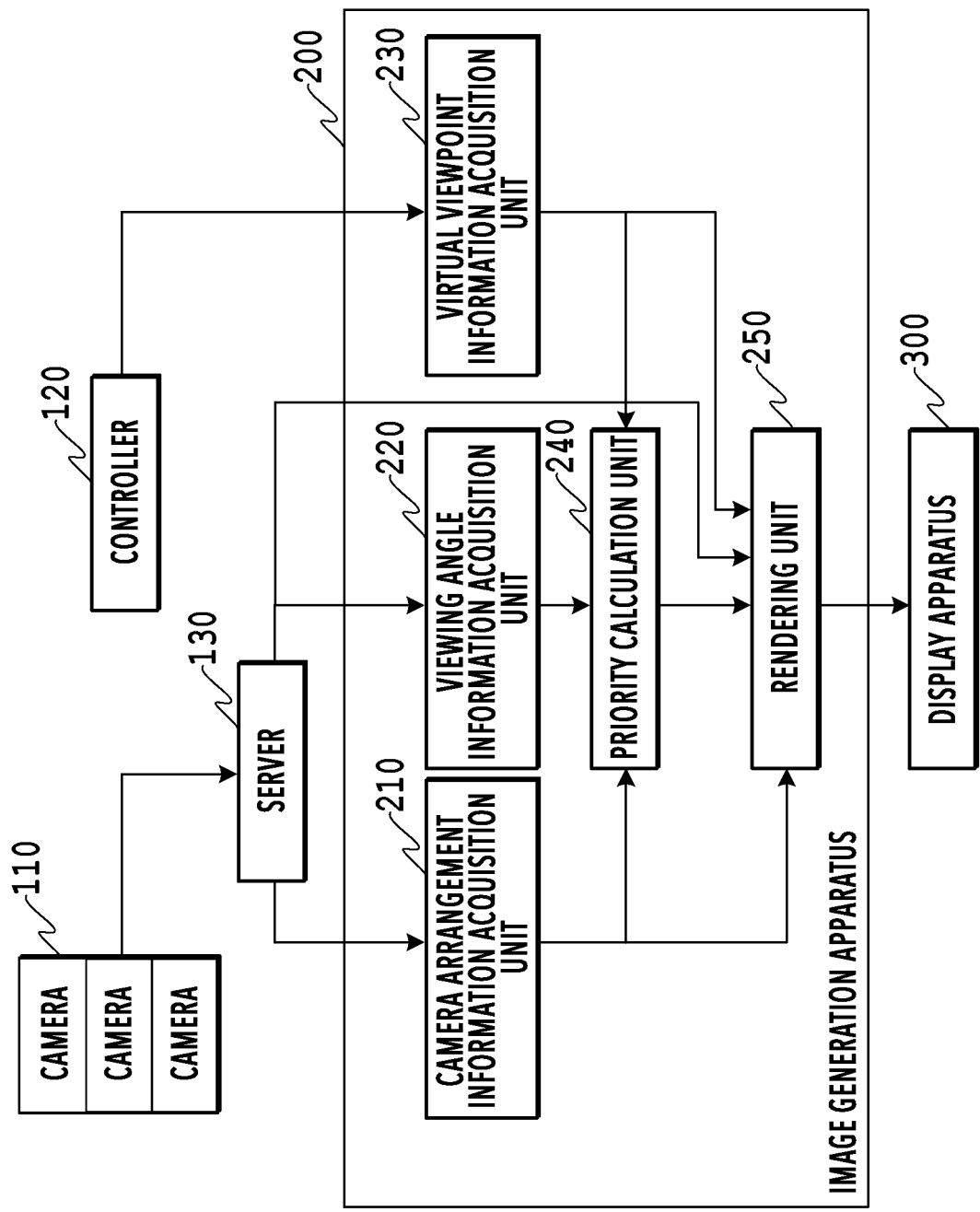
FIG. 7 is a system configuration diagram in a second embodiment.
Figure 8:
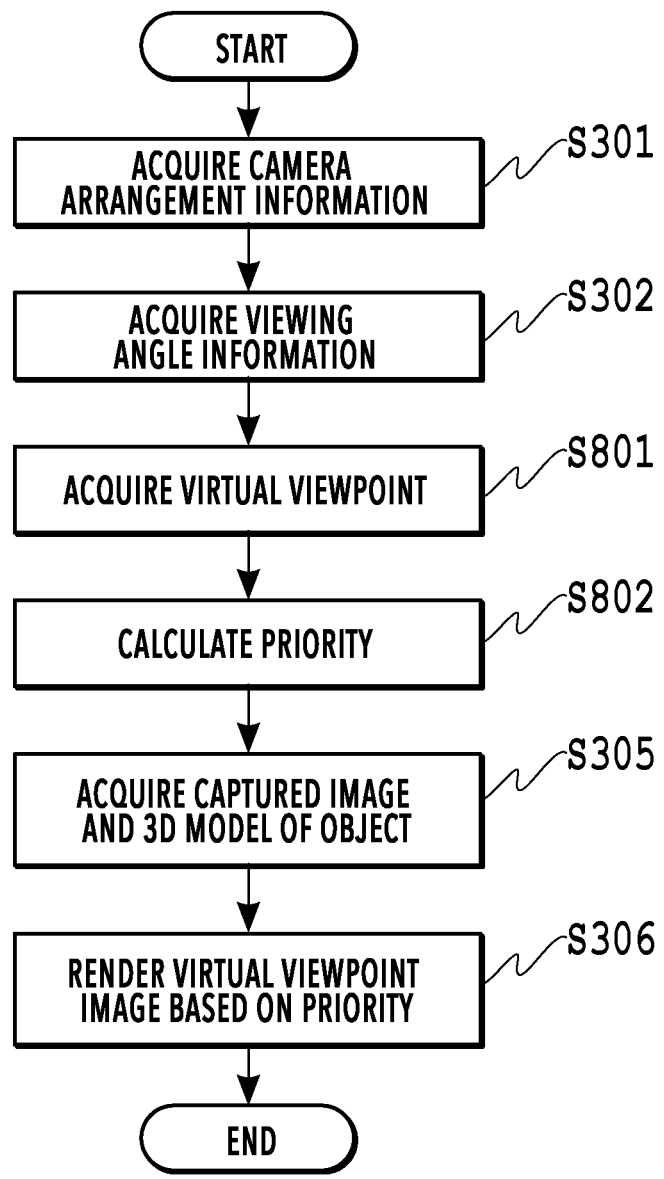
FIG. 8 is a diagram showing a processing flow of an image generation apparatus in the second embodiment.

FIG. 7 shows a system configuration. FIG. 8 shows a processing flow by each component of the image processing apparatus 200 in the present embodiment.

In step S801, the virtual viewpoint information acquisition unit 230 acquires virtual viewpoint information from the controller 120 via the network.

In step S802, the priority calculation unit 240 calculates a priority $P_m$ in consideration of the virtual viewpoint information acquired by the virtual viewpoint information acquisition unit 230. First, a priority $P_{vir}$ in consideration of a virtual viewpoint is calculated by the following formula (2) using the inner product of the view direction $R_{vir}=(rv_x, rv_y, rv_z)$ of the virtual viewpoint 10 and the optical axis direction $R_{opt}$ of the camera 110:

$$P_{vir} = R_{vir} \cdot R_{opt} = rv_x \times r_x + rv_y \times r_y + rv_z \times r_z \quad (2)$$

Next, a priority $P_m$ of a camera is calculated by the following formula (3) using the priority P and priority $P_{vir}$:

$$P_m = (P+1) \times (P_{vir} + 1)/4 \quad (3)$$

Figure 9:
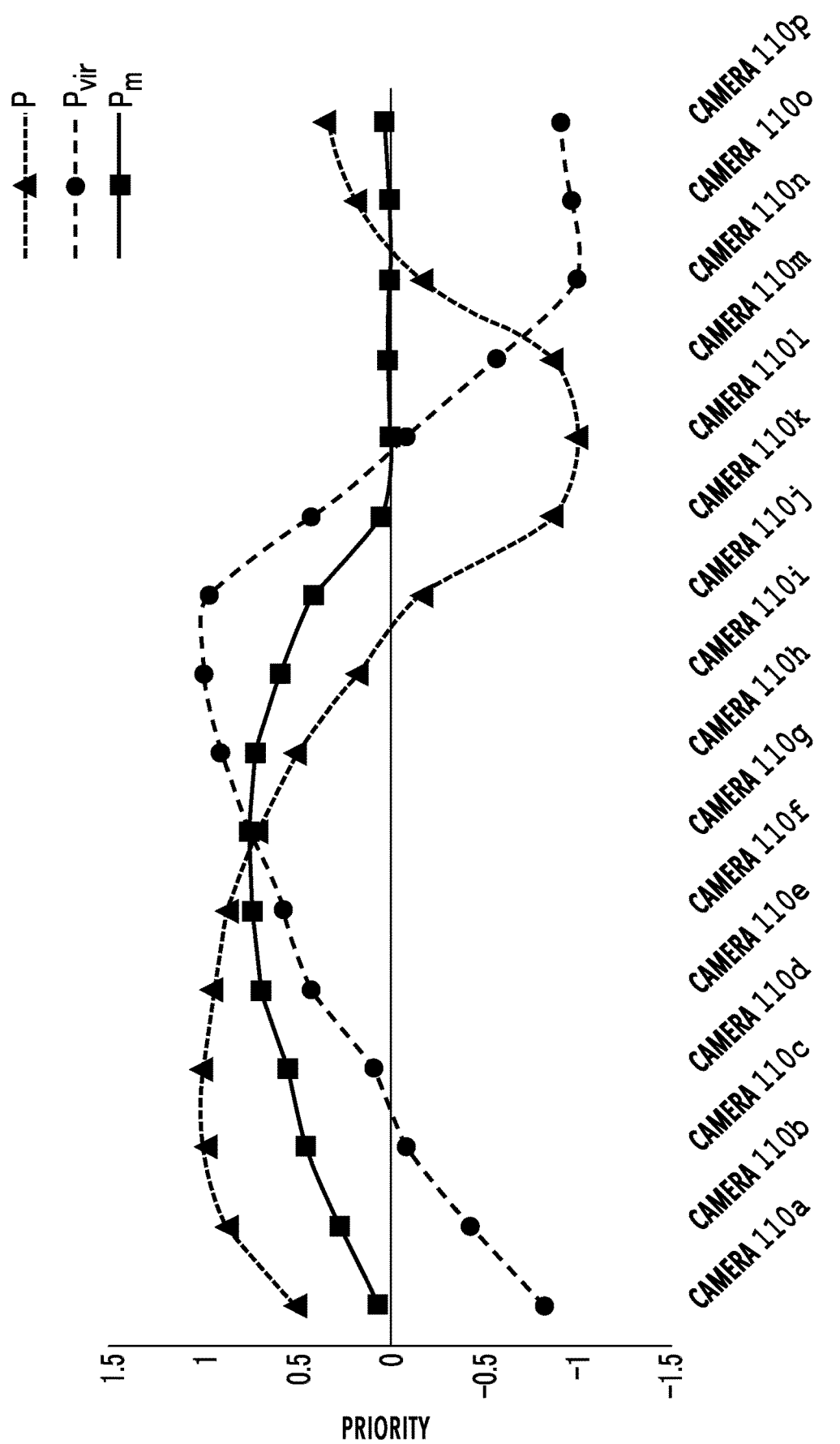
FIG. 9 is a diagram showing a priority of each camera in the second embodiment.

FIG. 9 shows the result of calculating priorities P, $P_{vir}$, and $P_m$ for each camera in the example shown in FIG. 4. The value of $P_m$ becomes maximum in a camera 110g satisfying the condition that the camera is close to the virtual viewpoint 10 and captures the LED display 6 from the front.

In step S306, the rendering unit 250 preferentially uses captured image data obtained by a camera with a high priority $P_m$ for rendering the LED display 6.

As described above, by using the priority $P_m$ in consideration of the priority $P_{vir}$ based on the virtual viewpoint and camera arrangement, the captured image data obtained by the camera 110g closer to the virtual viewpoint among the cameras capturing the LED display 6 from the front is used preferentially for rendering the LED display 6. This enables generation of virtual viewpoint image data in which the LED display 6 is clearly visible and has an appearance closer to the appearance from the virtual viewpoint.

Third Embodiment

In the present embodiment, a description will be given of a method of calculating a priority in consideration of a light distribution characteristic of the LED display as a part of viewing angle information.

The configuration and processing flow of the present embodiment are the same as those of the first embodiment except for step S302 and step S303, which will be described below. Therefore, the description of the same configuration and processing flow as the first embodiment will be omitted.

In step S302, the viewing angle information acquisition unit 220 acquires a light distribution characteristic $I_{led}(\theta)$ as a part of viewing angle information in addition to the position Ti e d of the object and the normal direction N of the display screen. The light distribution characteristic $I_{led}(\theta)$ is a function of an angle θ from the normal direction of a light-emitting surface and indicates the distribution of intensity of light emitted from the LED display 6. The light distribution characteristic $I_{led}(\theta)$ is measured and calculated in advance. That is, the light distribution characteristic $I_{led}(\theta)$ represents the luminance of the LED display 6 according to the angle of viewing the LED display 6. The light distribution characteristic $I_{led}(\theta)$ is stored in the server 130 in advance as part of viewing angle information.

Figure 10:
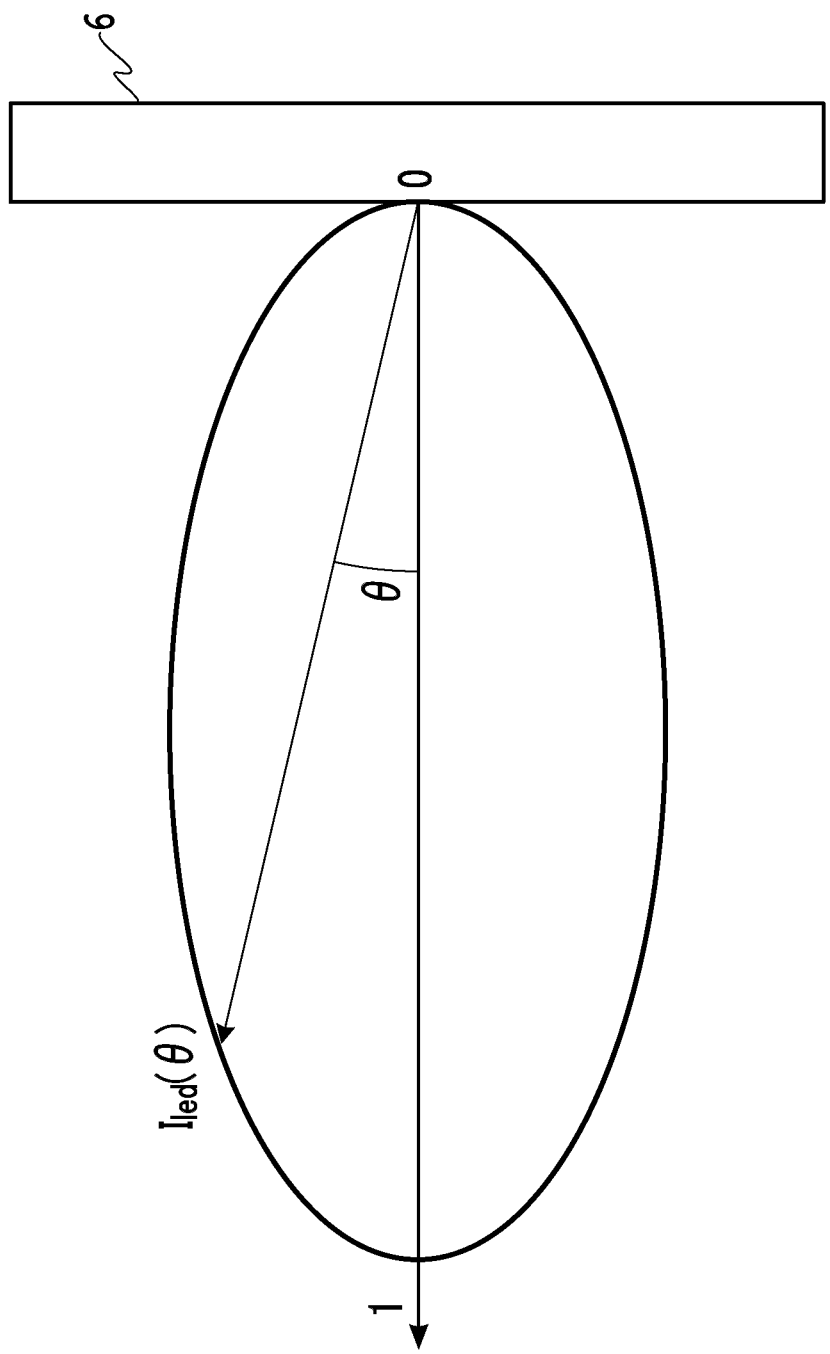
FIG. 10 is a diagram showing a light distribution characteristic of an LED display in a third embodiment.

FIG. 10 shows a typical example of the light distribution characteristic $I_{led}(\theta)$ of the LED display 6. The value becomes maximum at θ=0 and decreases as θ increases. The value of $I_{led}(\theta)$ is normalized such that the maximum value is 1.

In step S303, the priority calculation unit 240 calculates a priority based on the intensity of light directed to the camera 110 among light emitted from the LED display 6. Thus, an angle $\theta_c$ between the normal direction N of the display screen of the LED display 6 and the direction of the light toward the camera 110 is first calculated by the following formula (4):

$$\theta_c = \cos^{-1}\{(T - T_{led}) \cdot N / |T - T_{led}|\} \quad (4)$$

T represents the position of each camera, $T_{led}$ represents the position of the LED display 6, and N represents the normal direction of the display screen of the LED display 6. Accordingly, the intensity of the light emitted from the LED display 6 in the camera direction $\theta_c$ is a light distribution characteristic $I_{led}(\theta_c)$.

Based on the above, in the present embodiment, the priority $P_l$ in consideration of the light distribution characteristic is calculated by the following formula (5):

$$P_l = I_{led}(\theta_c) \quad (5)$$

Figure 11:
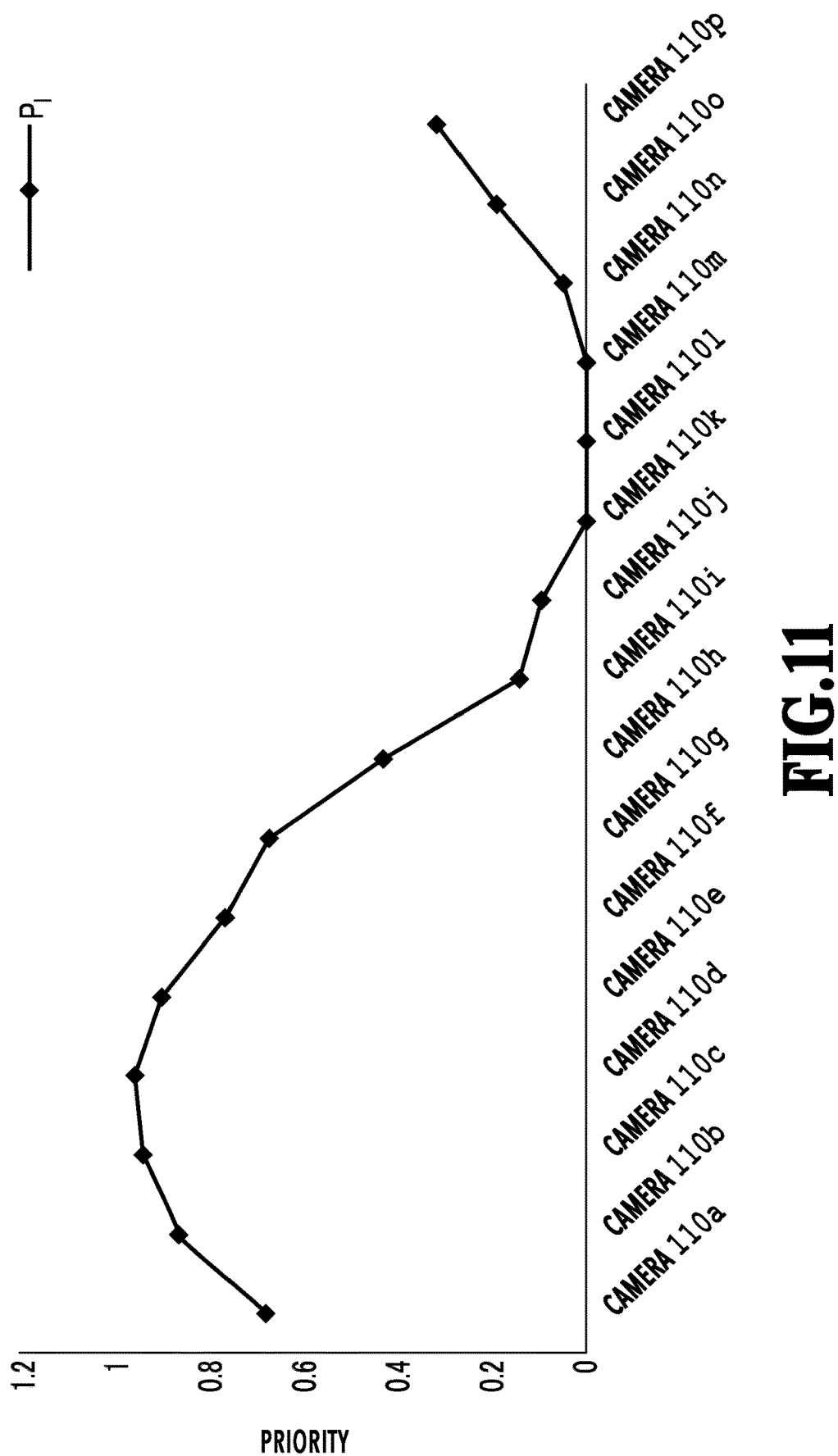
FIG. 11 is a diagram showing a priority of each camera in the third embodiment.

FIG. 11 shows the priority $P_l$ for each camera 110. Since the light intensity becomes maximum in the normal direction of the display screen of the LED display 6, the priority $P_l$ of the camera 110d becomes maximum.

In step S306, the rendering unit 250 preferentially uses captured image data obtained by a camera with a high priority $P_l$ for rendering the LED display 6.

As described above, rendering unit 250 preferentially uses captured image data obtained by a camera determined based on the priority calculated using the light distribution characteristic of the LED display 6 for rendering, thereby enabling generation of virtual viewpoint image data showing the LED display 6 more brightly.

Fourth Embodiment

In the present embodiment, a description will be given of a method of calculating a priority based on a histogram of a luminance of an image of the LED display captured by a camera as viewing angle information.

The configuration and processing flow of the present embodiment are the same as those of the first embodiment except for step S302 and step S303, which will be described below. Therefore, the description of the same configuration and processing flow as the first embodiment will be omitted.

In step S302, the viewing angle information acquisition unit 220 acquires, as viewing angle information, a histogram classifying the cameras 110 according to a median value of luminance in a pixel area corresponding to the LED display 6 in captured image data obtained by each camera 110. Instead of the median value of luminance in the pixel area, other values such as a mean value, mode, and standard deviation of luminance in the pixel area may be used.

Figure 12:
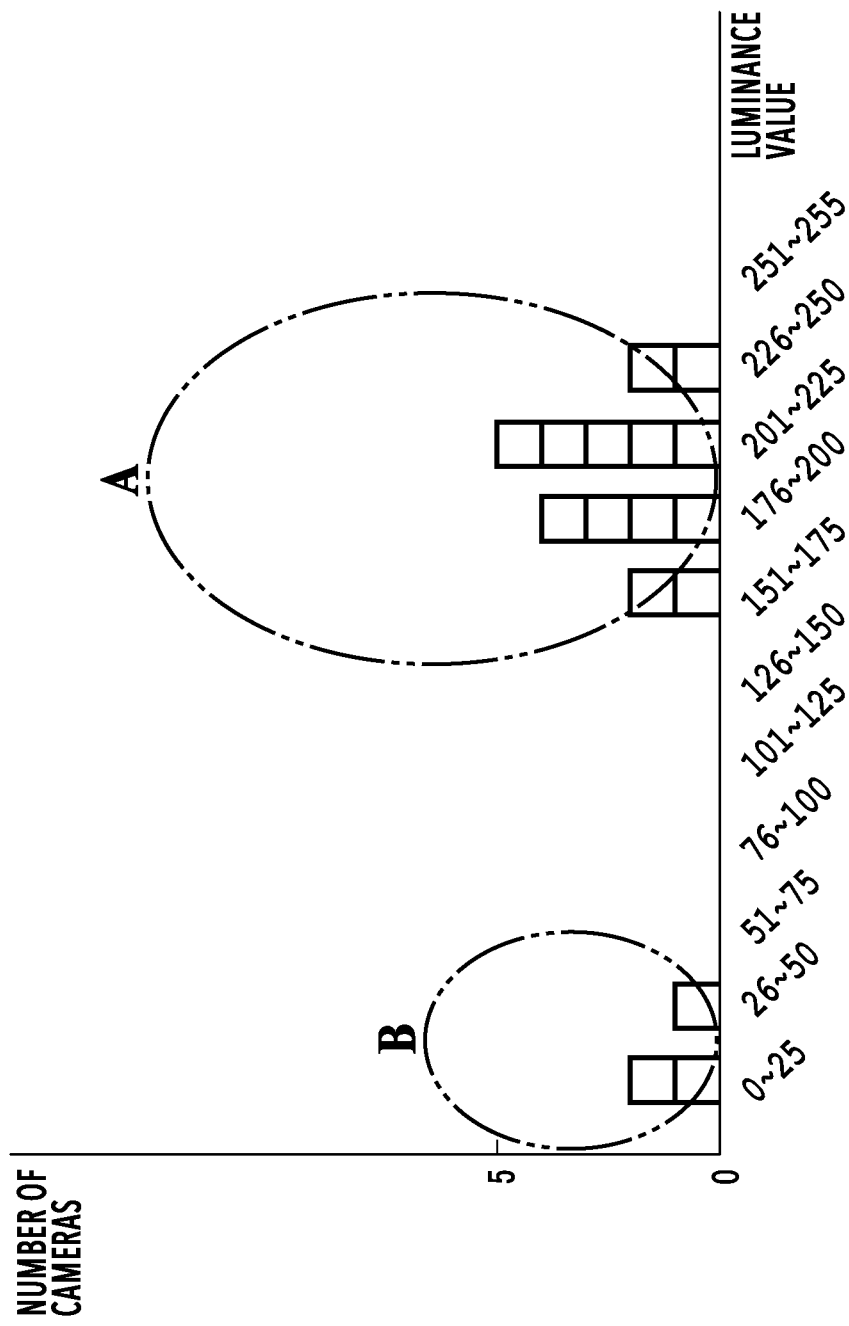
FIG. 12 is a diagram showing a histogram of a luminance of an LED display in a fourth embodiment.

FIG. 12 shows a histogram having a horizontal axis representing the median value of luminance in the pixel area corresponding to the LED display 6 and a vertical axis representing the number of cameras in the example shown in FIG. 4. Since the LED display 6 is captured from the front by a camera group A from which captured image data having relatively high luminance values in the pixel area corresponding to the LED display 6 has been obtained, it is considered that captured image data having high luminance values has been obtained. Since the LED display 6 is captured from the side or back by a camera group B from which captured image data having relatively low luminance values in the pixel area corresponding to the LED display 6 has been obtained, it is considered that captured image data having low luminance values has been obtained.

In step S303, the priority calculation unit 240 calculates a priority $P_h$ based on the histogram acquired as viewing angle information. First, priorities corresponding to the number of bins are assigned to the bins sequentially from a bin at which the luminance values in the pixel area corresponding to the LED display 6 in the captured image data are uppermost (luminance values 226 to 250). In the example shown in FIG. 12, the number of bins is 10 and priorities 1.0, 0.9, 0.8, 0.1 are assigned to the respective bins. That is, the priority 1.0 is assigned to the bin of the luminance values 226 to 250, the priority 0.9 is assigned to the bin of the luminance values 201 to 225, and the priority 0.1 is assigned to the bin of the luminance values 0 to 25.

Further, the priority $P_h$ of each camera 110 is set such that a difference in priority between cameras belonging to the same bin is a value divided equally the width of priority in each bin by the number of cameras belonging to the same bin. That is, in a case where two of the cameras 110 are included in the bin of the luminance values 226 to 250, 1.0 and 0.95 are set as the priorities $P_h$, respectively, from one by which the captured image data having a larger luminance value in the target pixel area is obtained. In a case where five of the cameras 110 are included in the bin of the luminance values 201 to 225, 0.9, 0.88, 0.86, 0.84, and 0.82 are set as the priorities $P_h$, respectively, from one by which the captured image data having a larger luminance value in the target pixel area is obtained. The priorities $P_h$ are similarly set for the rest of the cameras 110. The priority 0 is assigned to a camera from which captured image data showing the LED display 6 cannot be obtained.

In step S306, the rendering unit 250 uses preferentially uses captured image data obtained by the camera determined based on the priorities $P_h$ for rendering the LED display 6.

As describe above, in the present embodiment, captured image data obtained by a camera with a high priority determined based on viewing angle information including the histogram classifying the cameras according to the luminance values in the pixel area corresponding to the LED display 6 in the captured image data is preferentially used for rendering. This enables generation of virtual viewpoint image data in which the LED display 6 is rendered more brightly in the present embodiment.

The method of determining the priorities of the cameras based on the luminance values in the pixel area corresponding to the object in the captured image is not limited to the above. For example, a low priority may be set for a camera belonging to a bin of luminance values equal to or greater than a threshold (such as a bin of the luminance values 251 to 255) in the histogram shown in FIG. 12. This is because a captured image including a pixel having a too large luminance value includes a highlight-detail loss and the use of such a captured image for rendering may cause a reduction in image quality of a virtual viewpoint image. According to this method, in generation of a virtual viewpoint image including a reflective object having a glossy surface (such as a glass surface), it is possible to suppress a reduction in image quality of the virtual viewpoint image caused by rendering using a captured image by a camera into which strong reflect light enters.

Although different priorities are used in the first to fourth embodiments, these priorities may be used separately or together by multiplication or summation.

Other Embodiments

Embodiment(s) of the technique of this disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the technique of this disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technique of this disclosure, a reduction in visibility of a predetermined object in virtual viewpoint image data can be suppressed.

This application claims the benefit of Japanese Patent Application No. 2019-103846 filed Jun. 3, 2019, which is hereby incorporated by reference wherein in its entirety.

What is claimed is:

1. An image processing system comprising:
one or more memories storing instructions; and
one or more processors that execute the instructions to:
obtain images captured by a plurality of image capturing apparatuses;
obtain position information indicating position of a display surface of a display apparatus captured by one or more image capturing apparatuses whose view directions have a predetermined relationship with a normal direction of the display surface of the display apparatus among the plurality of image capturing apparatuses; and
generate a virtual viewpoint image showing the display surface of the display apparatus based on the obtained images and the position information.

2. The image processing system according to claim 1, wherein a difference between an optical axis direction according to an orientation of an image capturing apparatus, among the one or more image capturing apparatuses, capturing the image showing the display surface of the display apparatus and the normal direction to the display surface of the display apparatus is less than a difference between a view direction from the virtual viewpoint and the normal direction to the display surface of the display apparatus.

3. The image processing system according to claim 1, wherein:
the display surface is a light-emitting surface, and
the normal direction to the display surface of the display apparatus is a direction perpendicular to the light-emitting surface.

4. The image processing system according to claim 1, wherein an image capturing apparatus, among the one or more capturing apparatuses, capturing the image showing the display surface of the display apparatus has a smallest difference between the normal direction to the display surface of the display apparatus and an optical axis direction according to an orientation of the image capturing apparatus.

5. The image processing system according to claim 1, wherein:
the one or more processors execute the instructions to further set a priority of each image capturing apparatus, among the one or more image capturing apparatuses, based on the obtained image capturing information and the obtained display apparatus information, and
an image, among the obtained images used for generating the virtual viewpoint image is further determined based on the set priority.

6. The image processing system according to claim 5, wherein:
as a difference between an optical axis direction according to an orientation of an image capturing apparatus, among the one or more image capturing apparatuses, and the normal direction to the display surface of the display apparatus is smaller, a higher priority is set for the image capturing apparatus, and
an image captured by an image capturing apparatus, among the plurality of image capturing apparatuses, for which a high priority is set, is preferentially used for generating the virtual viewpoint image.

7. The image processing system according to claim 5, wherein the priority is determined based on the image capturing information, the display apparatus information, and viewpoint information for specifying a position of the virtual viewpoint and a view direction from the virtual viewpoint.

8. The image processing system according to claim 1, wherein:
the display apparatus information includes characteristic information for specifying a luminance of the display surface, and
an image, among the obtained images, to be used for generating the virtual viewpoint image is further determined from the characteristic information.

9. The image processing system according to claim 1, wherein the image showing the display surface of the display apparatus is used for determining a color of a three-dimensional model of the display apparatus.

10. The image processing system according to claim 1, wherein:
the one or more processors execute the instructions to further obtain virtual viewpoint information for specifying a position of the virtual viewpoint and a view direction from the virtual viewpoint, and
the virtual viewpoint image is generated based on, the image showing the display surface of the display apparatus, among the obtained images, and the obtained viewpoint information.

11. The image processing system according to claim 1, wherein a color of the display surface of the display apparatus in the virtual viewpoint image is determined based on one or more images showing a display surface of a display apparatus from the images.

12. The image processing system according to claim 1, wherein the one or more processors further execute the instructions to obtain the image showing the display surface of the display apparatus.

13. The image processing system according to claim 1, wherein the predetermined relationship is that view directions of the one or more image capturing apparatuses are parallel or nearly parallel to the normal direction of the display surface of the display apparatus.

14. The image processing system according to claim 1, wherein the virtual viewpoint image is generated based on images captured by the one or more image capturing apparatuses included in the obtained images.

15. An image processing method comprising:
obtaining images captured by a plurality of image capturing apparatuses;
obtaining position information indicating position of a display surface of a display apparatus captured by one or more image capturing apparatuses whose view directions have a predetermined relationship with a normal direction of the display surface of the display apparatus among the plurality of image capturing apparatuses; and
generating a virtual viewpoint image showing the display surface of the display apparatus based on the obtained images and the position information.

16. The image processing method according to claim 15, wherein a difference between an optical axis direction according to an orientation of an image capturing apparatus, among the one or more image capturing apparatuses, capturing the image showing the display surface of the display apparatus and the normal direction to the display surface of the display apparatus is less than a difference between a view direction from the virtual viewpoint and the normal direction to the display surface of the display apparatus.

17. A non-transitory computer readable storage medium storing a program executable by a computer to execute an image processing method comprising:
- obtaining images captured by a plurality of image capturing apparatuses;
- obtaining position information indicating position of a display surface of a display apparatus captured by one or more image capturing apparatuses whose view directions have a predetermined relationship with a normal direction of the display surface of the display apparatus among the plurality of image capturing apparatuses; and
- generating a virtual viewpoint image showing the display surface of the display apparatus based on the obtained images and the position information.

* * * * *